(12) United States Patent
Kanamarlapudi et al.

(10) Patent No.: US 9,768,910 B2
(45) Date of Patent: Sep. 19, 2017

(54) EVENT 6D ENHANCEMENTS

(71) Applicant: QUALCOMM Incorporated, San Diego, CA (US)

(72) Inventors: Sitaramanjaneyulu Kanamarlapudi, San Diego, CA (US); Arvindhan Kumar, San Diego, CA (US); Chetan Gopalakrishnan Chakravarthy, San Diego, CA (US); Luna Sapna D'Souza, San Diego, CA (US); Ajinkya Satish Godbole, San Diego, CA (US); Karthik Jayaprakash, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 9 days.

(21) Appl. No.: 14/641,038

(22) Filed: Mar. 6, 2015

(65) Prior Publication Data

US 2015/0373605 A1    Dec. 24, 2015

Related U.S. Application Data

(60) Provisional application No. 62/016,286, filed on Jun. 24, 2014.

(51) Int. Cl.
| | |
|---|---|
| *H04W 72/00* | (2009.01) |
| *H04L 1/00* | (2006.01) |
| *H04W 52/36* | (2009.01) |
| *H04W 88/06* | (2009.01) |

(52) U.S. Cl.
CPC ......... *H04L 1/0001* (2013.01); *H04W 52/365* (2013.01); *H04W 52/367* (2013.01); *H04W 88/06* (2013.01)

(58) Field of Classification Search
CPC .................................................. H04W 36/165
USPC ........................................... 455/452.1, 452.2
See application file for complete search history.

(56) References Cited

U.S. PATENT DOCUMENTS

| | | | |
|---|---|---|---|
| 2009/0175371 A1* | 7/2009 | Zhang ................... | H04W 52/16 375/260 |
| 2009/0316575 A1* | 12/2009 | Gholmieh ........... | H04W 76/048 370/225 |
| 2011/0222451 A1* | 9/2011 | Peisa ................. | H04W 52/0225 370/311 |

(Continued)

FOREIGN PATENT DOCUMENTS

EP            2538733        *    6/2011

*Primary Examiner* — Lester Kincaid
*Assistant Examiner* — Sayed T Zewari
(74) *Attorney, Agent, or Firm* — Arent Fox LLP

(57) ABSTRACT

The present aspects relate to enabling a user equipment (UE) to operate in Dual Carrier mode during wireless communication, including generating an event trigger to be transmitted to a network entity in response to the UE satisfying a maximum transmit power threshold value, wherein generating the event trigger initiates a trigger timer that controls when to transmit the event trigger to the network. The aspects further include determining whether a plurality of optimization conditions are met, and modifying a transmission scheme based on the determination that the plurality of optimization conditions are met, wherein modifying the transmission scheme prevents the transmission of the event trigger to the network entity and resets the trigger timer.

18 Claims, 9 Drawing Sheets

(56) References Cited

U.S. PATENT DOCUMENTS

2011/0310781 A1\* 12/2011 Kim ..................... H04L 5/0007
370/311

\* cited by examiner

EVENT 6D ENHANCEMENTS

CLAIM OF PRIORITY UNDER 35 U.S.C §119

The present Application for patent claims priority to U.S. Provisional Application No. 62/016,286 entitled "EVENT 6D ENHANCEMENTS" filed Jun. 24, 2014, assigned to the assignee hereof and hereby expressly incorporated herein by reference.

BACKGROUND

Aspects of the present disclosure relate generally to wireless communication systems, and more particularly, to enabling a UE to operate in Dual Carrier mode during wireless communication.

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

When a user equipment (UE) is configured with DC-HSUPA (Dual-Carrier High-Speed Uplink Packet Access), the UE is expected to select E-TFCI (E-DCH Transport Format Combination Identifier, where E-DCH is Enhanced Dedicated Channel) on both the activated UL Carriers, to be able to send a maximum number of bits. The maximum number of bits is a function of total grant given to the UE and total number of bits allowed based on the power headroom in addition to number of bits available to transmit. As transmission at a highest E-TFCI on both carriers has a higher power requirement, then such transmissions may result in triggering an Event 6D (The UE transmit power has reached its maximum value). In response, the network may reconfigure the UE to transmit at a lower peak rate, thereby reducing throughput, even though the UE may be in good radio conditions.

Thus, enhancements in operation of a UE in reporting Event 6D and in Dual Carrier mode are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present methods relate to enabling a user equipment (UE) to operate in Dual Carrier mode during wireless communication, comprising generating an event trigger to be transmitted to a network entity in response to the UE satisfying a maximum transmit power threshold value, wherein generating the event trigger initiates a trigger timer that controls when to transmit the event trigger to the network; determining whether a plurality of optimization conditions are met; and modifying a transmission scheme based on the determination that the plurality of optimization conditions are met, wherein modifying the transmission scheme prevents the transmission of the event trigger to the network entity and resets the trigger timer.

The present computer-readable medium storing computer executable code relate to enabling a UE to operate in Dual Carrier mode during wireless communication, comprising code for generating an event trigger to be transmitted to a network entity in response to the UE satisfying a maximum transmit power threshold value, wherein generating the event trigger initiates a trigger timer that controls when to transmit the event trigger to the network; code for determining whether a plurality of optimization conditions are met; and code for modifying a transmission scheme based on the determination that the plurality of optimization conditions are met, wherein modifying the transmission scheme prevents the transmission of the event trigger to the network entity and resets the trigger timer.

The present apparatus relate to enabling a UE to operate in Dual Carrier mode during wireless communication, comprising means for generating an event trigger to be transmitted to a network entity in response to the UE satisfying a maximum transmit power threshold value, wherein generating the event trigger initiates a trigger timer that controls when to transmit the event trigger to the network; means for determining whether a plurality of optimization conditions are met; and means for modifying a transmission scheme based on the determination that the plurality of optimization conditions are met, wherein modifying the transmission scheme prevents the transmission of the event trigger to the network entity and resets the trigger timer.

The present apparatus relate to enabling a UE to operate in Dual Carrier mode during wireless communication, comprising an event component configured to generate an event trigger to be transmitted to a network entity in response to the UE satisfying a maximum transmit power threshold value, wherein generating the event trigger initiates a trigger timer that controls when to transmit the event trigger to the network; a determining component configured to determine whether a plurality of optimization conditions are met; and a modifying component configured to modify a transmission scheme based on the determination that the plurality of optimization conditions are met, wherein modifying the transmission scheme prevents the transmission of the event trigger to the network entity and resets the trigger timer.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify corresponding components or actions throughout, where dashed lines may indicate optional components or actions, and wherein.

DETAILED DESCRIPTION

Figure 1:
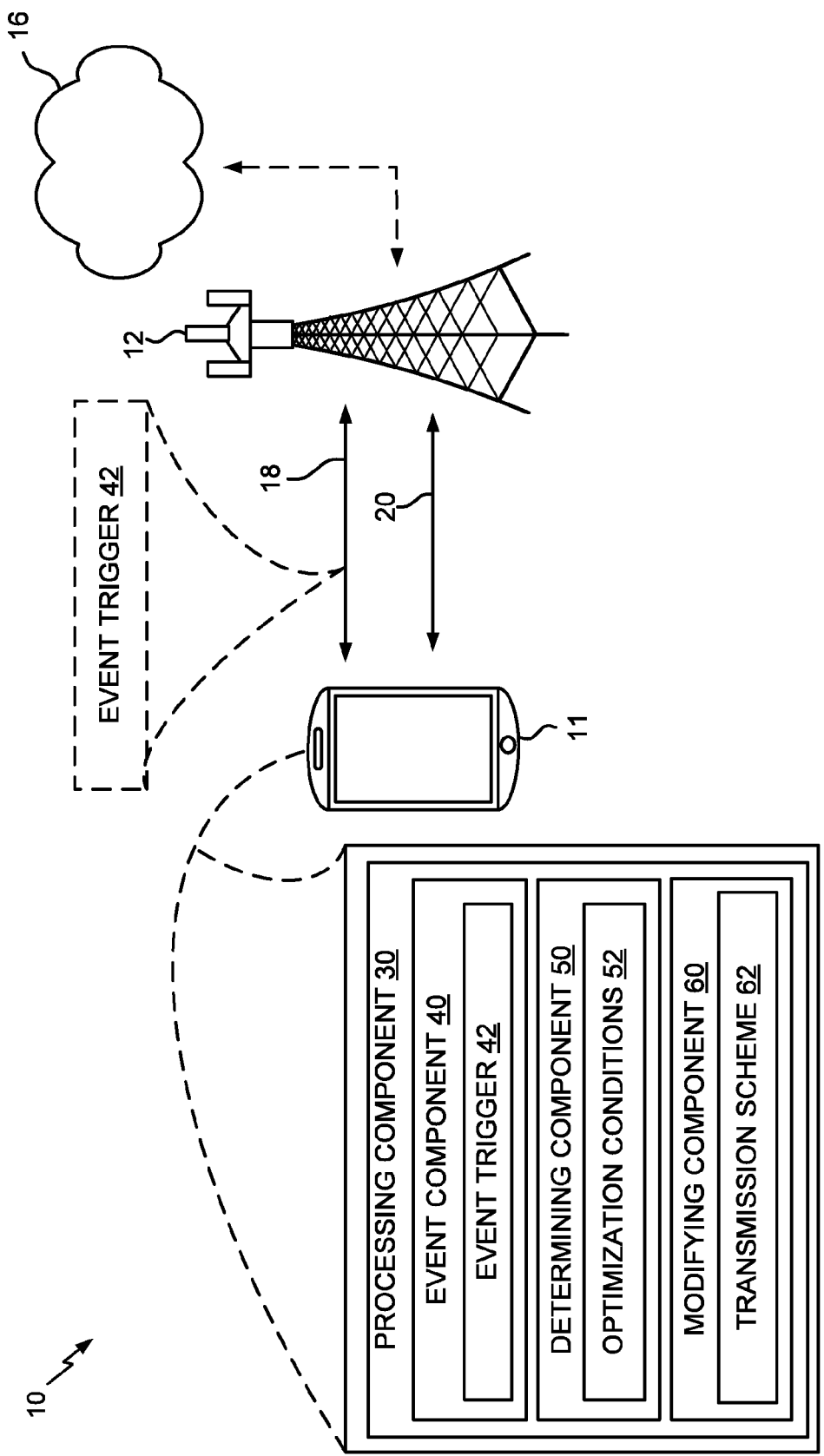
FIG. 1 is a schematic diagram illustrating an example wireless system of aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. In an aspect, the term "component" as used herein may be one of the parts that make up a system, may be hardware or software, and may be divided into other components.

With developments in wireless communication technologies, a greater number of users require high data rate services for applications running on their mobile devices (also referred to herein as user equipment). In order to provide an adequate user experience, W-CDMA was upgraded to HSPA and later to HSDPA in order to improve downlink capabilities. Additionally, W-CDMA was upgraded to HSUPA in order to improve uplink capabilities. Upgrading to HSUPA provided W-CDMA with a new transport channel, called an uplink enhanced dedicated channel (E-DCH). This upgrade to HSUPA allows for increased opportunities for a number of relatively high data usage applications, such as voice over Internet Protocol (VoIP), uploading pictures and sending large e-mail messages, by increasing the uplink data rate, the capacity, and also reducing latency. In general, the data traffic generated by mobile devices may be considered to be "bursty" traffic, e.g., the amount of data transmitted may vary dramatically over time, which is particularly suitable for multiplexing on a shared data channel. For example, significant capacity improvements can be achieved for bursty mobile device data traffic by aggregating multiple carriers into a single shared data channel. Dual-Carrier High-Speed Uplink Packet Access (DC-HSUPA) is a carrier aggregation technique for addressing the uplink challenge using existing carrier resources in a network. In essence, DC-HSUPA, also referred to as Dual Carrier mode, combines two uplink carriers into a larger data channel with joint scheduling of uplink traffic across the two carriers. DC-HSUPA, or Dual Carrier mode, allows mobile devices to make use of instantaneous spare capacity available on either carrier, thus achieving multiplexing gain and load balancing. The benefit is a significant efficiency improvement which leads to higher system capacity.

The present aspects generally relate to enabling a UE to operate in Dual Carrier mode for extended periods of time during wireless communication. Specifically, for example in a HSUPA implementation, when the UE is not power headroom limited (e.g., limited from increasing a transmit power) from transmitting according to the highest E-DCH Transport Format Combination Identifier (E-TFCI) on both carriers in Dual Carrier mode, and if the UE buffer is sufficiently large (e.g., to supply enough data) to transmit according to the highest E-TFCI on both carriers, then the UE may select the highest E-TFCI on both carriers. For instance, in some implementations, the highest E-TFCI may be E-TFCI 127 per the current 3GPP standards. Moreover, when the UE is configured with a large buffer for storing data packets for transmitting in the uplink, then there is a possibility that UE will continuously transmit at the highest E-TFCI. As transmission at the highest E-TFCI on both carriers has a relatively high power requirement—control metrics such as betas and control channel power can cause the UE to trigger the Event 6D (e.g., an event that indicates that the UE transmit power has reached its maximum value, and that causes the UE to report the Event 6D to the network if the Event 6D conditions are met for a Time To Trigger (TTT) duration). It should be noted that the triggering of Event 6D may not be limited to use of the highest ETFCI being transmitted on both the activated Uplink Carriers, but can also be seen in cases where the UE is not power headroom limited and is transmitting a large amount of data. For example, Event 6D triggering conditions may be satisfied if the UE transmit (Tx) Power reaches the maximum value, where the UE Tx Power in this case may include the Pilot DPCCH power and the power used by the E-DCH transmission.

Traditionally, when the Event 6D conditions are met for the TTT, then the reporting of the Event 6D by the UE to the network causes the network to change the transmission scheme of the UE, e.g., to use less transmit power, to transmit less frequently, and/or to increase redundancy. For example, traditionally the reporting of the Event 6D to the network is performed because the UE transmitting at a maximum transmit power is generally considered an indication that the UE is in bad radio conditions, e.g., at an edge of cell coverage and/or in an area with high interference or noise, where such UE transmissions may be causing interference to other UEs or network components, such as base stations. So, if the condition (e.g., UE transmitting at its maximum transmit power) triggering the Event 6D is maintained for the configured "TimeToTrigger" (TTT), then the UE may report the Event 6D to the network as part of an Internal Measurement reporting to the network. In response, the network may be configured take one or more actions based on its internal scheduling algorithms, such as limiting the UE grant on one or both carriers (when the UE is operating in Dual Carrier mode), or reconfiguring the UE to reduce the transmit power, such as reconfiguring from DC-HSUPA to SC-HSUPA.

For example, whenever the UE reports Event 6D during DC-HSUPA (e.g., due to use of a high E-TFCI on both carriers for a TTT duration), then the network may reconfigure the UE from DC-HSUPA with a 2 ms TTI (Transmission Time Interval) to SC-HSUPA (Single-Carrier HSUPA) with a 10 ms TTI. As this causes the UE to be reconfigured from having uplink throughput at a 11.2 Mbps peak rate to a 1.8 Mbps peak rate, then the UE suffers a high degradation in uplink throughput, even though the UE may be in good radio conditions. Further, the network may not readily reconfigure the UE from SC-HSUPA with a 10 ms TTI back to DC-HSUPA with a 2 ms TTI. For instance, the network may configure the UE back to DC-HSUPA with a 2 ms TTI only after the UE transitions to a Cell-FACH state and then back to a Cell-DCH state. Therefore, once the UE moves to SC-HSUPA with a 10 ms TTI, then the UE is generally stuck in SC-HSUPA for a remaining duration of a data transfer, which gives inferior throughput to the UE compared to the original configuration.

Accordingly, in some aspects, the present methods and apparatuses may provide an efficient solution, as compared to current solutions, by enabling a UE to stay in Dual Carrier mode even after an Event 6D condition is triggered if certain conditions are met to ensure that the UE is capable of optimally operating in Dual Carrier mode. In other words, the present aspects recognize that a UE operating in Dual Carrier mode may trigger an Event 6D, even though the UE is not in bad radio conditions (e.g., at the edge of a cell; in an area with low signal to noise ratio, etc). As such, the present aspects provide one or more mechanisms to pre-emptively avoid maintaining the Event 6D condition for the TTT duration, when the UE is operating in Dual Carrier mode and when the UE is not in bad radio conditions (e.g., when the UE has met one or more optimization conditions, as described below). For instance, the present aspects may alter a UE transmission scheme to avoid maintaining the Event 6D condition for the duration of the TTT, thereby avoiding reporting the Event 6D to the network and avoiding the resulting network reconfiguration of the UE to a lower uplink throughput configuration (e.g., SC-HSUPA). As a result, the present methods and apparatuses may enable a UE to maintain operation in Dual Carrier mode for extended periods of time during wireless communication by preventing unnecessary switching to Single Carrier mode, thereby maximizing uplink throughput as compared to current solutions.

Referring to FIG. 1, in one aspect, a wireless communication system 10 is configured to facilitate enabling a UE to operate in Dual Carrier mode for extended periods of time during wireless communication. Wireless communication system 10 includes at least one UE 11 that may communicate wirelessly with one or more networks (e.g., network 16) via one or more network entities, including, but not limited to, network entity 12. For example, in an aspect, network entity 12 may be configured to transmit and receive one or more signals via one or more communication channels 18 and 20 to/from UE 11. In certain instances, communication channels 18 and 20 may enable UE 11 to operate in Dual Carrier mode, wherein UE 11 may transmit two separate signals on two separate carriers (e.g., two separate frequencies or frequency bands). In an aspect, for example, when UE 11 is configured with Dual Carrier High Speed Uplink Packet Access (DC-HSUPA), UE 11 may transmit on active uplink carriers on communication channels 18 and 20 to network entity 12, where communication channels 18 and 20 are E-DCH channels.

In an aspect, UE 11 may include a processing component 30, which may be configured to enable UE 11 to operate in Dual Carrier mode for extended periods of time during wireless communication with network 16 even after generating an event trigger 42. Specifically, in an aspect, processing component 30 of UE 11 may include event component 40, which may be configured to generate an event trigger 42, such as an Event 6D, to be transmitted to a network entity 12 in response to the UE 11 satisfying a maximum transmit power threshold value. In an aspect, the maximum transmit power threshold value is a value that may be communicated by the network entity 12 to UE 11, or that UE 11 may have stored in a memory.

For example, in some instances, the maximum transmit power threshold value is a limit for the highest UE transmit power. For instance, there may be either a network controlled limit or a physical limit related to UE 11. In an aspect, if an uplink closed loop power control procedure tries to order UE 11 to increase a transmit power above the maximum transmit power threshold value and UE 11 cannot perform the increase due to the limit, then such a condition will cause poor uplink transmission quality for UE 11. As such, it is desirable for network entity 12 to receive an early warning from UE 11 about this condition, so it is possible for network entity 12 and/or network 16 to take appropriate actions (e.g. to lower the bit rate so the power requirement is reduced). Hence, if UE 11 cannot increase its transmit power upon demand from the uplink closed loop power control procedure, then UE 11 generates an event trigger 42 that could trigger a report, e.g., an Event 6D, of the triggering conditions to network entity 12, e.g., if the conditions persist for a TTT duration. For example, event component 40 may initiate a trigger timer in response to generating the event trigger 42, where the trigger timer controls when to transmit event trigger 42 to the network. In certain aspects, the trigger timer may correspond to or keep track of a Time-To-Trigger (TTT), which is a set amount of time or time period threshold over which the condition (e.g., transmit power at the maximum transmit power threshold value) that triggered the Event 6D should be maintained in order for UE 11 to report the Event 6D to network entity 12 and/or some other entity of network 16. For example, event component 40 may initiate the trigger timer once the event trigger 42 is generated. Once the trigger timer expires and/or reaches the TTT, UE 11 and/or processing component 30 may be configured to transmit the event trigger 42 to network entity 12. The event trigger 42 may be configured to cause the network entity 12 and/or another entity of network 16 to transmit a reconfiguration message, which, for example, may cause the UE 11 to reconfigure from Dual Carrier mode (e.g., DC-HSUPA) to Single Carrier mode (e.g., SC-HSUPA).

In a further aspect, processing component 30 may include determining component 50, which may be configured to determine whether a plurality of optimization conditions 52 are met that may allow UE 11 to continue to operate in Dual Carrier mode, or to avoid transmitting event trigger 42 to network entity 12, despite generating event trigger 42 and initiating trigger timer. For example, the plurality of optimization conditions 52 may include conditions that allow operation of UE 11 at a relatively high transmit power value, e.g., at or near a maximum transmit power threshold value, without causing UE 11 to send event trigger 42 to network entity 12. For instance, the plurality of optimization conditions 52 may relate to one or more of: (i) whether the UE 11 satisfies the event trigger 42 (e.g., transmit power at the maximum transmit power threshold value, such as when operating according to a relatively high transport format indicator) on both carriers in the Dual Carrier mode, or (ii) whether the UE 11 would not satisfy the event trigger 42

(e.g., transmit power at the maximum transmit power threshold value, such as when operating according to a relatively high transport format indicator) if UE 11 were to operate on one carrier in a Single Carrier mode, or (iii) whether a UE control power requirement satisfies a power ratio threshold (e.g., whether a UE traffic to pilot ratio (T2P) is greater than a T2P threshold). In other words, the plurality of optimization conditions 52 test whether or not UE 11 is transmitting at high power (e.g., optimization conditions (i) and (ii) above), and whether such transmission are occurring because UE 11 is trying to maximize uplink data throughput or because UE 11 is operating in bad radio conditions (e.g., optimization condition (ii) and/or (iii) above). In other words, by testing the plurality of optimization conditions 52, determining component 50 of the present aspects can tell if UE 11 is maxing out on its transmit power and if the T2P ratio is relatively good (as defined by the T2P threshold value), thereby enabling UE 11 and processing component 30 to know if it is acceptable to take actions to avoid sending the Event 6D to network entity 12. For example, in an aspect, determining component 50 may determine whether the plurality of optimization conditions 52 are met before the trigger timer expires and/or reaches a timer threshold. When determining component 50 determines that the plurality of optimization conditions 52 are met, then processing component 30 may configure modifying component 60 to modify a transmission scheme 62 to avoid sending the Event 6D to network entity 12. Transmission scheme 62 may include one or more transmission configuration parameters of UE 11, or one or more messages sent by UE 11 to network entity 12. For example, modifying component 60 may modify transmission scheme 62 to cause UE 11 to transmit using a lower ETFCI (relative to a current ETFCI), or to DTX, on one or multiple carriers for some number of TTIs. In another example, modifying component 60 may modify transmission scheme 62 to cause UE 11 to indicate less transmit buffer occupancy (relative to an actual transmit buffer occupancy) to network entity 12, which will cause network entity 12 to reduce the grant on one or multiple carriers. As a result, modifying the transmission scheme 62 prevents the transmission of the event trigger 42 from UE 11 to the network entity 12 at the expiration of the trigger timer, and resets the trigger timer thereby causing the UE 11 to operate in Dual Carrier mode for an extended period of time. In an aspect, for example, the resetting of the trigger timer may cause UE 11 or modifying component 60 to set the trigger timer to expire in a TTT duration, and cause the trigger timer to not start running until initiated by a subsequent triggering event 42. However, if determining component 50 determines that the plurality of optimization conditions 52 are not met, then processing component 30 may configure modifying component 60 to transmit the event trigger 42 to network entity 12 (in one non-limiting example, over communication channel 18 in FIG. 1, as illustrated by the dashed lines associating event trigger 42 with communication channel 18), and thereby cause the network entity 12 to reconfigure the UE 11.

UE 11 may comprise a mobile apparatus and may be referred to as such throughout the present disclosure. Such a mobile apparatus or UE 11 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

Additionally, the one or more wireless nodes, including, but not limited to, network entity 12 of wireless communication system 10, may include one or more of any type of network component, such as an access point, including a base station or node B, a relay, a peer-to-peer device, an authentication, authorization and accounting (AAA) server, a mobile switching center (MSC), a radio network controller (RNC), etc. In a further aspect, the one or more wireless serving nodes of wireless communication system 10 may include one or more small cell base stations, such as, but not limited to a femtocell, picocell, microcell, or any other base station having a relatively small transmit power or relatively small coverage area as compared to a macro base station.

Figure 2:
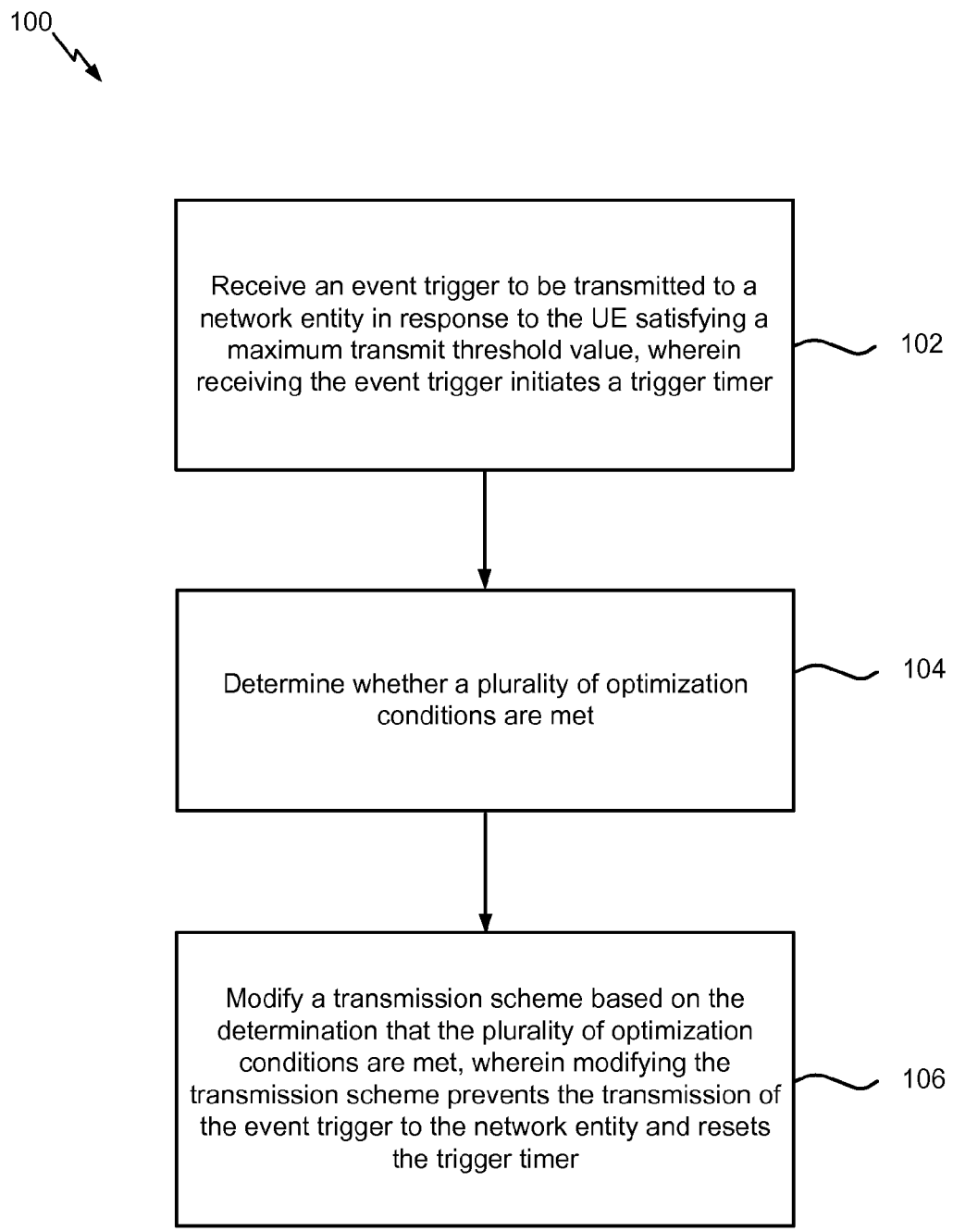
FIG. 2 is a flow diagram illustrating an exemplary method in a wireless communication system.

Referring to FIG. 2, in an operational aspect, a UE such as UE 11 (FIG. 1) may perform one aspect of a method 100 for enabling UE 11 to operate in Dual Carrier mode on communication channels 18 and 20 for extended periods of time during wireless communication with network 16 via network entity 12. Method 100 is shown and described as a series of acts for purposes of simplicity of explanation. However, it is to be understood and appreciated that method 100 (and further methods related thereto) are not limited by the order of acts, as some acts may, in accordance with one or more aspects, occur in different orders and/or concurrently with other acts from that shown and described herein. For example, it is to be appreciated that the methods may alternatively be represented as a series of interrelated states or events, such as in a state diagram. Moreover, not all illustrated acts may be required to implement a method in accordance with one or more features described herein.

At block 102, method 100 may include generating an event trigger to be transmitted to a network entity in response to the UE satisfying a maximum transmit power threshold value, wherein generating the event trigger initiates a trigger timer. For example, as described herein, UE 11 (FIG. 1) may execute processing component 30 and/or event component 40 to generate event trigger 42, which may correspond to UE 11 satisfying a maximum transmit power threshold value, and which can be transmitted to network entity 12 in response to the UE 11 satisfying the maximum transmit power threshold value for a TTT duration. For instance, processing component 30 and/or event component 40 may measure a transmit power on one or more uplink carriers, such as communication channels 18 and 20 (which may be E-DCH channels when UE 11 is operating in Dual Carrier mode or DC-HSUPA) and compare the measured value(s) to a threshold in order to determine whether to generate event trigger 42. In some aspects, generating the event trigger 42 initiates a trigger timer, where trigger timer may expire after a TTT duration. In some aspects, the event trigger 42 may comprise an Event 6D trigger, which is generated when UE 11 reaches a maximum value of its transmit power (e.g., maximum transmit power threshold value).

At block 104, method 100 may include determining whether a plurality of optimization conditions are met. For example, as described herein, UE 11 (FIG. 1) may execute processing component 30 and/or determining component 50 to determine whether a plurality of optimization conditions 52 are met. For example, the plurality of optimization conditions 52 may relate to one or more of: (i) whether the UE 11 satisfies the event trigger 42 (e.g., transmit power at the maximum transmit power threshold value, such as when operating according to a relatively high transport format indicator) on both carriers in the Dual Carrier mode, or (ii) whether the UE 11 would not satisfy the event trigger 42 (e.g., transmit power at the maximum transmit power threshold value, such as when operating according to a relatively high transport format indicator) if UE 11 were to operate on one carrier in a Single Carrier mode, or (iii) whether a UE control power requirement satisfies a power ratio threshold (e.g., whether a UE traffic to pilot ratio (T2P) is greater than a T2P threshold, thereby indicating good radio conditions). As explained herein, the plurality of optimization conditions 52 test whether or not UE 11 is transmitting at high power (e.g., optimization conditions (i) and (ii) above), and whether such transmission are occurring because UE 11 is trying to maximize uplink data throughput or because UE 11 is operating in bad radio conditions (e.g., optimization condition (ii) and/or (iii) above). Additional aspects relating to the plurality of optimization conditions 52, and to determining whether the plurality of optimization conditions 52 are met, are described below with regard to FIGS. 3 and 4.

Further, at block 106, method 100 may include modifying a transmission scheme based on the determination that the plurality of optimization conditions are met, wherein modifying the transmission scheme prevents the transmission of the event trigger to the network entity and resets the trigger timer. For example, as described herein, UE 11 (FIG. 1) may execute modifying component 60 to modify a transmission scheme 62 based on the determination that the plurality of optimization conditions 52 are met. Transmission scheme 62 may include one or more transmission configuration parameters of UE 11, or one or more messages sent by UE 11 to network entity 12. For example, modifying component 60 may modify transmission scheme 62 to cause UE 11 to transmit using a lower ETFCI (relative to a current ETFCI), or to DTX, on one or multiple carriers for some number of TTIs. In another example, modifying component 60 may modify transmission scheme 62 to cause UE 11 to indicate less transmit buffer occupancy (relative to an actual transmit buffer occupancy) to network entity 12, which will cause network entity 12 to reduce the grant on one or multiple carriers. In some aspects, modifying component 60 modifies the transmission scheme 62 to prevent the transmission of the event trigger 42 to the network entity 12 upon expiration of the trigger timer, and to reset the trigger timer. In an aspect, for example, the resetting of the trigger timer may cause UE 11 or modifying component 60 to set the trigger timer to expire in a TTT duration, and cause the trigger timer to not start running until initiated by a subsequent triggering event 42. As such, in an aspect, UE 11 will remain in Dual Carrier mode, e.g., at the expiration of the trigger timer, since the event trigger 42 is prevented from being transmitted to network entity 12, thereby preventing the network entity 12 from reconfiguring UE 11 to Single Carrier mode. As a result or resetting the trigger timer, UE 11 is configured to operate in Dual Carrier mode for an extended period of time.

Figure 3:
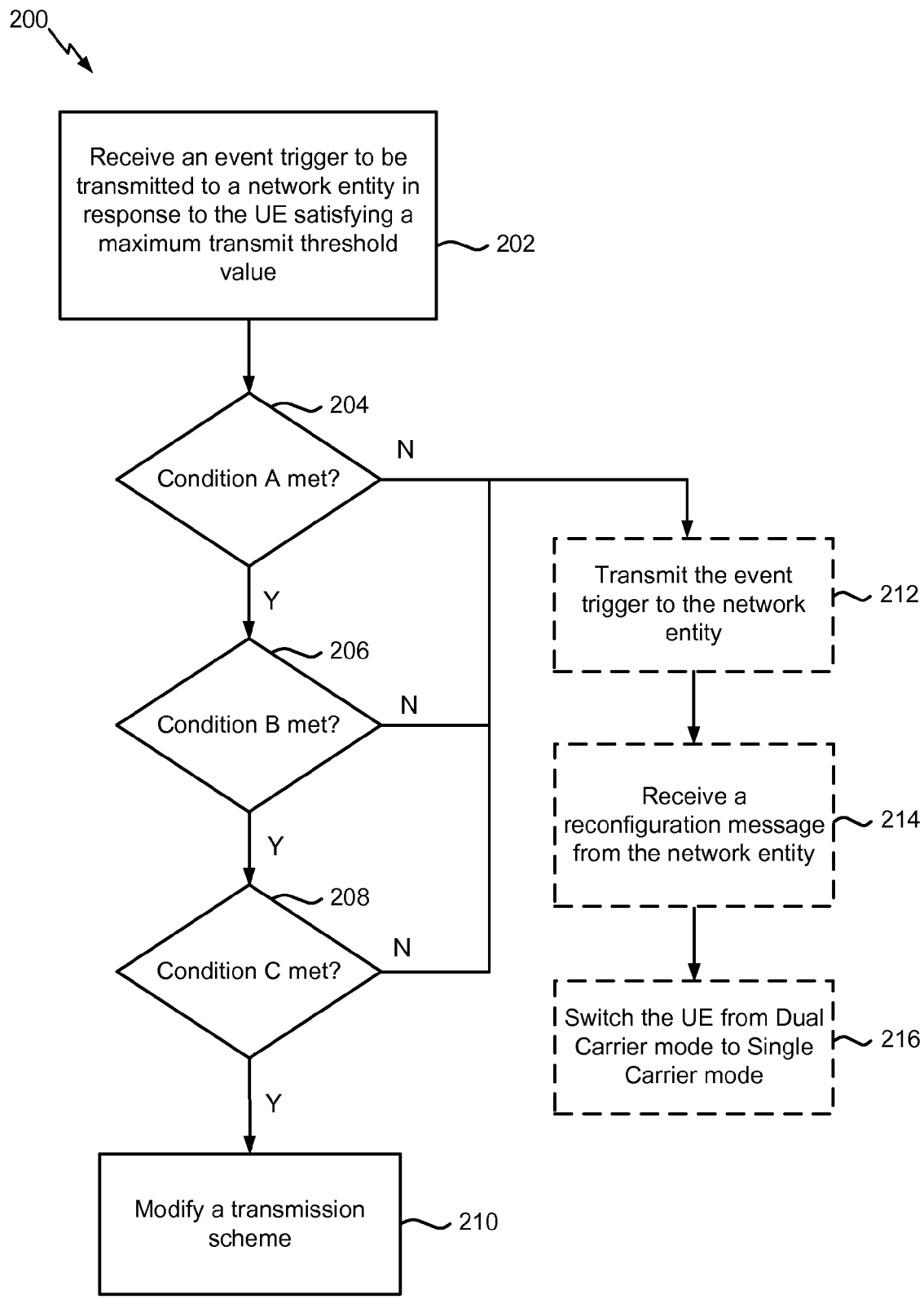
FIG. 3 is a flow diagram illustrating another exemplary method in a wireless system.
Figure 4:
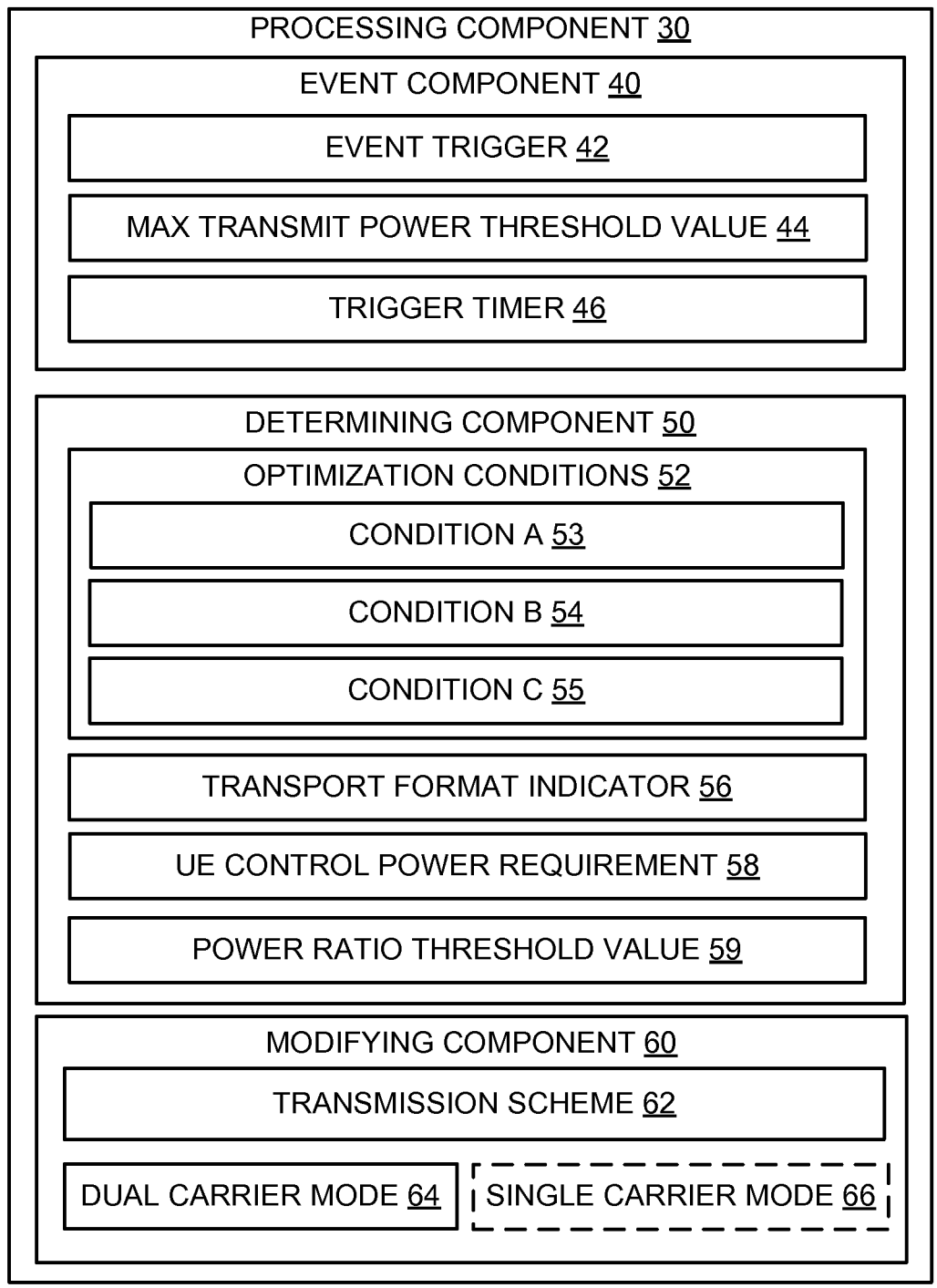
FIG. 4 is a schematic diagram illustrating an example of an aspect of processing component of the present disclosure.

Referring to FIGS. 3 and 4, an example of one or more operations (FIG. 3) and/or subcomponents (FIG. 4) of an aspect of processing component 30 (FIG. 1) according to the present apparatus and methods are described with reference to one or more methods and one or more components that may perform the actions or functions of these methods. Although the operations described below are presented in a particular order and/or as being performed by an example component, it should be understood that the ordering of the actions and the components performing the actions may be varied, depending on the implementation. Also, although processing component 30 is illustrated as having a number of subcomponents, it should be understood that one or more of the illustrated subcomponent may be separate from, but in communication with, processing component 30. Moreover, it should be understood that the following actions or functions described with respect to processing component 30 and/or its subcomponents may be performed by a specially-programmed processor, a processor executing specially-programmed software or computer-readable media, or by any other combination of a hardware component and/or a software component specially configured for performing the described actions or functions.

In a particular aspect, referring to FIG. 3, a method 200 of wireless communication includes, at block 202, generating an event trigger to be transmitted to a network entity in response to the UE satisfying a maximum transmit power threshold value. In an aspect, for instance, processing component 30 may execute event component 90 (FIG. 4) to generate an event trigger 42 to be transmitted to a network entity 12 (FIG. 1) in response to the UE 11 satisfying a maximum transmit power threshold value 44. In some instances, generating the event trigger 42 initiates a trigger timer 46. In other instances, the event trigger 42 may comprise an Event 6D trigger which is triggered when UE 11 reaches a maximum value of a transmit power (e.g., maximum transmit power threshold value 44). In a further instance, the trigger timer 46 may be set to count down a TimeToTrigger (TTT), e.g., a triggering time duration, and trigger timer 46 may be configured to initiate (and start counting down TTT) once the event trigger 42 is generated. Once the TTT expires and/or reaches a certain timer threshold, e.g., the TTT, UE 11 and/or processing component 30 may be configured to transmit the event trigger 42 (e.g., Event 6D) to the network entity 12 if the condition (e.g., UE 11 transmitting at maximum transmit power threshold value 44) corresponding to event trigger 42 is maintained for the TTT.

Further, at blocks 204, 206, and 208, method 200 includes determining whether one or more of a plurality of optimization conditions 52 is met. Although illustrated as performing such determinations in a certain order, it should be understood that blocks 204, 206, and 208 may be performed in any order, and/or may be performed simultaneously. In an aspect, for example, by performing the determinations of blocks 204, 206, and 208, execution of method 200 by UE 11 may allow UE 11 to determine if UE 11 can take actions to maintain operation in a Dual Carrier mode, such as DC-HSUPA, when triggering event 42 is triggered.

For example, at block 204 (FIG. 3), method 200 may include determining whether a first one, e.g., Condition A 53, of a plurality of optimization conditions 52 is met. In an aspect, for instance, processing component 30 may execute determining component 50 (FIG. 4) to determine whether Condition A 53 is met by determining whether the UE 11 satisfies the condition of event trigger 42 (e.g., UE 11 transmitting at maximum transmit power threshold value 44), which may correspond to a transport format indicator 56, on both carriers in the Dual Carrier mode 64. In some instances, the transport format indicator 56 may comprise an Enhanced Dedicated Channel (E-DCH) Transport Format Combination Indication (E-TFCI), which includes information about a transport block set size. The transport block set is a set of transport blocks which are the basic unit exchanged between L1 and media access control (MAC), for L1 processing. The transport block set is exchanged between L1 and MAC at the same time instance using the same transport channel. The transport block set size is the number of bits in a transport block set. In general, the E-TFCI is configured so as to maximize the number of bits transmitted to the network. The maximum number of bits is a function of the total grant given to the UE and the total number of bits allowed based on the power headroom in addition to the number of bits available to transmit. As such, determining component 50 may be configured to determine whether UE 11 is satisfying the Event 6D (e.g., event trigger 42 corresponding to UE 11 transmitting at maximum transmit power threshold value 44) for a certain E-TFCI (e.g., transport format indicator 56) on both carriers during Dual Carrier mode 64. In an aspect, the E-TFCI is likely to be a highest possible E-TFCI when UE 11 is operating in DC-HSUPA. As such if it is determined that Condition A 53 is met by determining that the UE 11 satisfies the event trigger 42 for a transport format indicator 56 on both carriers in the Dual Carrier mode 64, then method 200 may proceed to block 206. However, if it is determined that Condition A 53 is not met by determining that the UE 11 does not satisfy the event trigger 42 for a transport format indicator 56 on both carriers in the Dual Carrier mode 64, then method 200 may proceed to block 212.

Also, at block 206 (FIG. 3), method 200 may include determining whether a second one, e.g., Condition B 54, of a plurality of optimization conditions 52 is met. In an aspect, for instance, processing component 30 may execute determining component 50 (FIG. 4) to determine whether Condition B 54 is met by determining whether the UE 11 would not satisfy the event trigger 42 for the transport format indicator 56 (used in the Dual Carrier mode) if UE 11 were to operate on one carrier in a Single Carrier mode 66. For example, determining component 50 may determine whether the UE 11 would not satisfy the Event 6D (e.g., event trigger 42) for a relatively higher value of E-TFCI (e.g., transport format indicator 56) on a first carrier during Single Carrier mode 66 and while the second carrier is configured with a different E-TFCI. In certain instances, determining component 50 may hypothetically configure UE 11 in a hypothetical Single Carrier mode 66 (e.g., SC-HSUPA) in order to determine whether UE 11 does not satisfy the event trigger 42 for the transport format indicator 56 (used in the Dual Carrier mode) on one carrier. If UE 11 is unable to satisfy Condition B (e.g., if the hypothetical setup in the single carrier mode would still cause event trigger 42), then it indicates that UE 11 is operating in poor radio conditions and that the triggering of the Event 6D was not due to high E-TFCI usage during DC-HSUPA. For example, when the first carrier is operating with an E-TFCI of 120, the determining component 50 may determine, hypothetically, whether the first carrier alone satisfies the Event 6D. As such if it is determined that Condition B 54 is met by hypothetically determining that the UE 11 does not satisfy the event trigger 42 for the transport format indicator 56 on one carrier in a Single Carrier mode 66, then method 200 may proceed to block 208. However, if it is determined that Condition B 54 is not met by hypothetically determining that the UE 11 satisfies the event trigger 42 for the transport format indicator 56 on one carrier in a Single Carrier mode 66, then method 200 may proceed to block 212.

Additionally, at block 208 (FIG. 3), method 200 may include determining whether a third one, e.g., Condition C 55, of a plurality of optimization conditions 52 is met. In an aspect, for instance, processing component 30 may execute determining component 50 (FIG. 4) to determine whether Condition C 55 is met by determining whether a UE control power requirement 58 satisfies a power ratio threshold 59. In an aspect, for example, the UE control power requirement 58 may include a metric such as a traffic to pilot ratio (T2P), which measures the ratio of the traffic channel transmit power to the pilot channel transmit power. In an aspect, for example, the traffic channel transmit power may be E-DCH transmit power (e.g., for one and/or for both carriers), and the pilot channel transmit power may be the Pilot DPCCH transmit power. As the T2P ratio indicates the traffic channel power relative to the current pilot channel power, the T2P ratio thereby is a measure of a radio condition experienced by UE 11. In certain instances, the higher the T2P value, the better the radio conditions may be at UE 11. For example, determining component 50 may determine whether the T2P of UE 11 is greater than a power ratio threshold value 59. The power ratio threshold value 59 may be configured to, for example, 3 dB. Therefore, if the T2P of UE 11 is greater than 3 dB, then determining component 50 may determine that Condition C 55 is met, meaning that UE 11 is experiencing relatively good radio conditions that do not justify sending Event 6D to network entity 12. In certain instances, if the T2P ratio is less than the power ratio threshold 59, it may indicate that both traffic power and pilot power are at high levels, which may indicate that the Event 6D was triggered due to poor radio conditions and that reporting the Event 6D is warranted if the condition is maintained for the TTT. As such if it is determined that Condition C 55 is met by determining that the UE control power requirement 58 satisfies power ratio threshold 59, then method 200 may proceed to block 210. However, if it is determined that Condition C 55 is not met, then method 200 may proceed to block 212.

In an aspect, the combination of Condition A 52, Condition B 54, and Condition C 55 should be met in order for method 200 to proceed to block 210. In other words, in an aspect, if any of Condition A 52, Condition B 54, and Condition C 55 are not met, then method 200 will proceed to block 212.

Additionally, in an aspect, at block 210 (FIG. 3), method 200 may include modifying a transmission scheme. In an aspect, for instance, processing component 30 may execute modifying component 60 (FIG. 4) to modify a transmission scheme 62. For example, modifying component 60 may modify the transmission scheme 62 based on the determination that Condition A 53, Condition B 54, and Condition C 55 are all met. In some instances, modifying the transmission scheme 62 prevents the transmission of the event trigger 42 to the network entity 12 and resets the trigger timer 46, e.g., so that trigger timer 46 is ready to start counting down TTT upon a subsequent triggering event. In certain aspects, modifying the transmission scheme 62 may include, but is not limited to, lowering the transport format indicator 56 on at least one or both carriers in the Dual Carrier mode 64, switching to Discontinuous Transmission (DTX) on at least one or both carriers in the Dual Carrier mode 64, and/or transmitting a buffer indicator to the network entity 12, wherein the buffer indicator indicates a lower-than-actual level of data packets in a transmit buffer of UE 11, which causes the network entity 12 to reduce a grant on one or both of carriers of the UE 11 in Dual Carrier mode 64 based on the buffer indicator. In these instances, the modified transmission schemes 62 may be established for a specified time period, for example, a certain number of transmission time intervals (TTIs) configured to insure that the transmit power of UE 11 is reduced a sufficient amount such that the conditions of triggering event 42 are not met for a duration of the TTT. As such, modifying the transmission scheme 62 allows the UE 11 to remain in Dual Carrier mode, e.g., after expiration of trigger timer 46, since the modifications prevent event trigger 42 from being transmitted to network entity 12, e.g., thereby preventing the network entity 12 from reconfiguring UE 11 to Single Carrier mode. Furthermore, in some aspects, modifying the transmission scheme 62 may help prevent the UE 11 from triggering another Event 6D.

Moreover, in an optional aspect, at block 212 (FIG. 3), method 200 may optionally include transmitting the event trigger to the network entity. In an aspect, for instance, processing component 30 may execute event component 40 (FIG. 4) to transmit the event trigger 42 to the network entity based at least in part on the plurality of optimization conditions 52 not being met. For example, event component 40 may transmit the event trigger 42 to the network entity 12, upon expiration of trigger timer 46 and upon determining that the conditions that initiated event trigger 42 (e.g., UE transmit power at a maximum transmit power threshold value) were maintained for a duration of the TTT. Such a scenario may occur based on the determination that the plurality of optimization conditions 52 are not met, and hence modifying component 60 may not proceed to modify transmission scheme 62 to avoid maintaining of the conditions initiating event trigger 42 for the duration of the TTT.

In another optional aspect, at block 212 (FIG. 3), method 200 may optionally include receiving a reconfiguration message from the network entity. In an aspect, for instance, processing component 30 and/or modifying component 60 (FIG. 4) to receive a reconfiguration message from the network entity 12 in response to transmitting the Event 6D message to the network entity 12. For example, the reconfiguration message may cause modifying component 60 to reconfigure UE 11, such as to limit the grant on one or both carriers of the UE 11 in Dual Carrier mode 64. In another instance, the reconfiguration message may be configured to cause the UE 11 and/or modifying component 60 to reconfigure from operating in Dual Carrier mode 64 (e.g., DC-HSUPA) to operating in Single Carrier mode 66 (e.g., SC-HSUPA).

In an optional aspect, at block 212 (FIG. 3), method 200 may optionally include switching the UE from Dual Carrier mode to Single Carrier mode. In an aspect, for instance, processing component 30 may execute modifying component 60 (FIG. 4) to switch the UE from Dual Carrier mode 64 to Single Carrier mode 66. For example, modifying component 60 may reconfigure from Dual Carrier mode 64 (e.g., DC-HSUPA) to Single Carrier mode 66 (e.g., SC-HSUPA) based on the reconfiguration message received from the network entity 12. As such, the UE 11 may be reconfigured from, for example, DC-HSUPA having a 2 ms TTI to SC-HSUPA having a 10 ms TTI, and thus, reducing an uplink data throughput from 11.2 Mbps peak rate to 1.8 Mbps peak rate.

Figure 5:
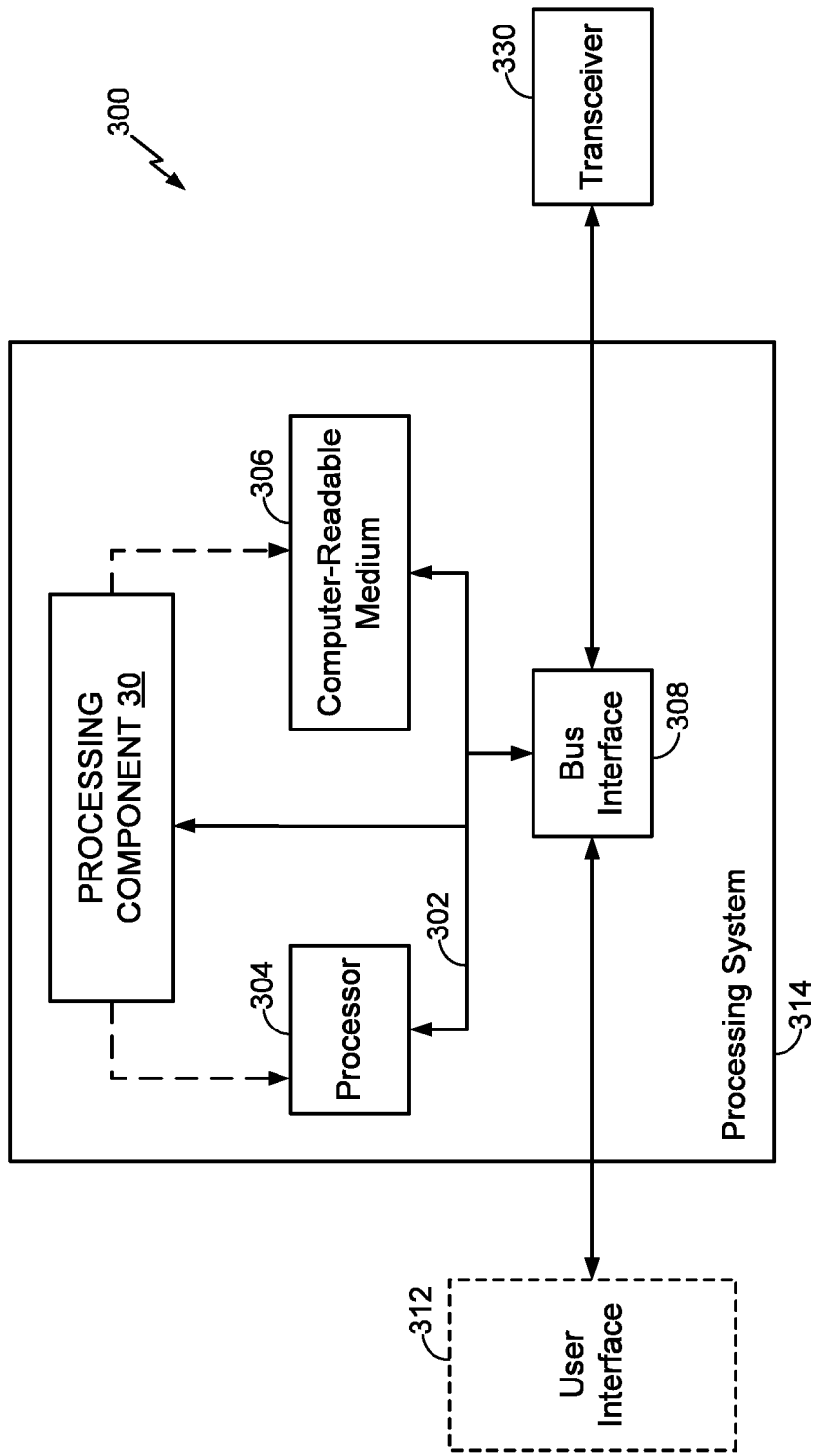
FIG. 5 is a diagram illustrating an example of a hardware implementation for an apparatus employing a processing system.

FIG. 5 is a conceptual diagram illustrating an example of a hardware implementation for an apparatus 300 employing a processing system 314 including processing component 30 discussed herein that is operable to enable a UE, such as UE 11 (FIG. 1), to operate in Dual Carrier mode for extended periods of time during wireless communication, as described herein. In other words, in an aspect, apparatus 300 may be the same as or similar to UE 11, or apparatus 300 may be a component of UE 11. Processing component 30 may be a separate component within processing system 314, and/or, as illustrated by the dashed lines, processing component 30 may be implemented in hardware as one or more processor modules within processor 304, or as software or computer-executable code or instructions executable by processor 304 and stored in computer-readable medium 306. In this example, the processing system 314 may be implemented with a bus architecture, represented generally by the bus 302. The bus 302 may include any number of interconnecting buses and bridges depending on the specific application of the processing system 314 and the overall design constraints. The bus 302 links together various circuits including one or more processors, represented generally by the processor 304, and computer-readable media, represented generally by the computer-readable medium 306. The bus 302 may also link various other circuits such as timing sources, peripherals, voltage regulators, and power management circuits, which are well known in the art, and therefore, will not be described any further. A bus interface 308 provides an interface between the bus 302 and a transceiver 310. The transceiver 310 provides a means for communicating with various other apparatus over a transmission medium. Depending upon the nature of the apparatus, a user interface 312 (e.g., keypad, display, speaker, microphone, joystick) may also be provided.

The processor 304 is responsible for managing the bus 302 and general processing, including the execution of software (e.g., defining processing component 30) stored on the computer-readable medium 306 to enable a UE to operate in Dual Carrier mode for extended periods of time during wireless communication based on the operation of processing component 30 as described herein. Also, in an aspect, processor 304 may execute one or more processor modules (e.g., defining processing component 30) to enable a UE to operate in Dual Carrier mode for extended periods of time during wireless communication based on the operation of processing component 30 as described herein. The software, when executed by the processor 304, causes the processing system 314 to perform the various functions described infra, including Event 6D enhancements associated with the operation of processing component 30 as described herein, for any particular apparatus. The computer-readable medium 306 may also be used for storing data that is manipulated by the processor 304 when executing software.

The various concepts presented throughout this disclosure may be implemented across a broad variety of telecommunication systems, network architectures, and communication standards.

Figure 6:
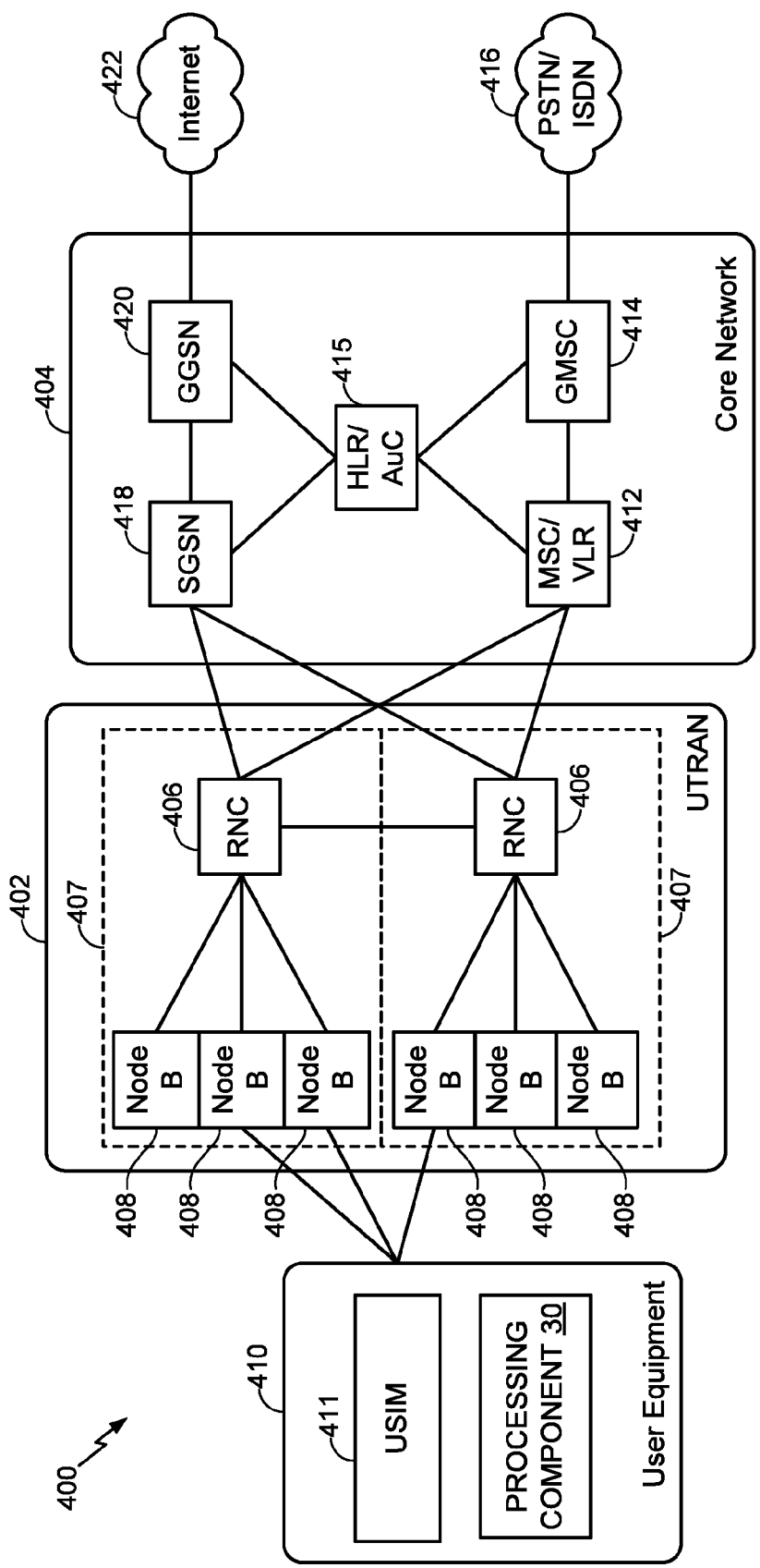
FIG. 6 is a block diagram conceptually illustrating an example of a telecommunications system.

Referring to FIG. 6, by way of example and without limitation, the aspects of the present disclosure are presented with reference to a UMTS system 400 employing a W-CDMA air interface and including a UE 401, which may be the same as or similar to UE 11 (FIG. 1), where UE 401 includes processing component 30 operable to enable the UE to operate in Dual Carrier mode for extended periods of time during wireless communication, described herein. Although described with respect to a UMTS network, UE 401 executing processing component 30 as described herein may operate in any type of communication network using any type of communication protocol or standard that may employ event-triggered reporting for a UE internal measurement similar to the Event 6D triggered event, as described above. A UMTS network includes three interacting domains: a Core Network (CN) 404, a UMTS Terrestrial Radio Access Network (UTRAN) 402, and UE 410. In this example, the UTRAN 402 provides various wireless services including telephony, video, data, messaging, broadcasts, and/or other services. The UTRAN 402 may include a plurality of Radio Network Subsystems (RNSs) such as an RNS 407, each controlled by a respective Radio Network Controller (RNC) such as an RNC 406. Here, the UTRAN 402 may include any number of RNCs 406 and RNSs 407 in addition to the RNCs 406 and RNSs 407 illustrated herein. The RNC 406 is an apparatus responsible for, among other things, assigning, reconfiguring and releasing radio resources within the RNS 407. The RNC 406 may be interconnected to other RNCs (not shown) in the UTRAN 402 through various types of interfaces such as a direct physical connection, a virtual network, or the like, using any suitable transport network.

Communication between a UE 410 and a Node B 408 may be considered as including a physical (PHY) layer and a medium access control (MAC) layer. Further, communication between a UE 410 and an RNC 406 by way of a respective Node B 408 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in Radio Resource Control (RRC) Protocol Specification, 3GPP TS 25.331 v9.1.0, incorporated herein by reference.

The geographic region covered by the SRNS 407 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 408 are shown in each SRNS 407; however, the SRNSs 407 may include any number of wireless Node Bs. The Node Bs 408 provide wireless access points to a core network (CN) 404 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 410 may further include a universal subscriber identity module (USIM) 411, which contains a user's subscription information to a network. For illustrative purposes, one UE 410 is shown in communication with a number of the Node Bs 408. The downlink (DL), also called the forward link, refers to the communication link from a Node B 408 to a UE 410, and the uplink (UL), also called the reverse link, refers to the communication link from a UE 410 to a Node B 408.

The core network 404 interfaces with one or more access networks, such as the UTRAN 402. As shown, the core network 404 is a GSM core network. However, as those skilled in the art will recognize, the various concepts presented throughout this disclosure may be implemented in a RAN, or other suitable access network, to provide UEs with access to types of core networks other than GSM networks.

The core network 404 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the core network 404 supports circuit-switched services with a MSC 412 and a GMSC 414. In some applications, the GMSC 414 may be referred to as a media gateway (MGW). One or more RNCs, such as the RNC 406, may be connected to the MSC 412. The MSC 412 is an apparatus that controls call setup, call routing, and UE mobility functions. The MSC 412 also includes a visitor location register (VLR) that contains subscriber-related information for the duration that a UE is in the coverage area of the MSC 412. The GMSC 414 provides a gateway through the MSC 412 for the UE to access a circuit-switched network 416. The core network 404 includes a home location register (HLR) 415 containing subscriber data, such as the data reflecting the details of the services to which a particular user has subscribed. The HLR is also associated with an authentication center (AuC) that contains subscriber-specific authentication data. When a call is received for a particular UE, the GMSC 414 queries the HLR 415 to determine the UE's location and forwards the call to the particular MSC serving that location.

The core network 404 also supports packet-data services with a serving GPRS support node (SGSN) 418 and a gateway GPRS support node (GGSN) 420. GPRS, which stands for General Packet Radio Service, is designed to provide packet-data services at speeds higher than those available with standard circuit-switched data services. The GGSN 420 provides a connection for the UTRAN 402 to a packet-based network 422. The packet-based network 422 may be the Internet, a private data network, or some other suitable packet-based network. The primary function of the GGSN 420 is to provide the UEs 410 with packet-based network connectivity. Data packets may be transferred between the GGSN 420 and the UEs 410 through the SGSN 418, which performs primarily the same functions in the packet-based domain as the MSC 412 performs in the circuit-switched domain.

The UMTS air interface is a spread spectrum Direct-Sequence Code Division Multiple Access (DS-CDMA) system. The spread spectrum DS-CDMA spreads user data through multiplication by a sequence of pseudorandom bits called chips. The W-CDMA air interface for UMTS is based on such direct sequence spread spectrum technology and additionally calls for a frequency division duplexing (FDD). FDD uses a different carrier frequency for the uplink (UL) and downlink (DL) between a Node B 408 and a UE 410. Another air interface for UMTS that utilizes DS-CDMA, and uses time division duplexing, is the TD-SCDMA air interface. Those skilled in the art will recognize that although various examples described herein may refer to a WCDMA air interface, the underlying principles are equally applicable to a TD-SCDMA air interface.

Figure 7:
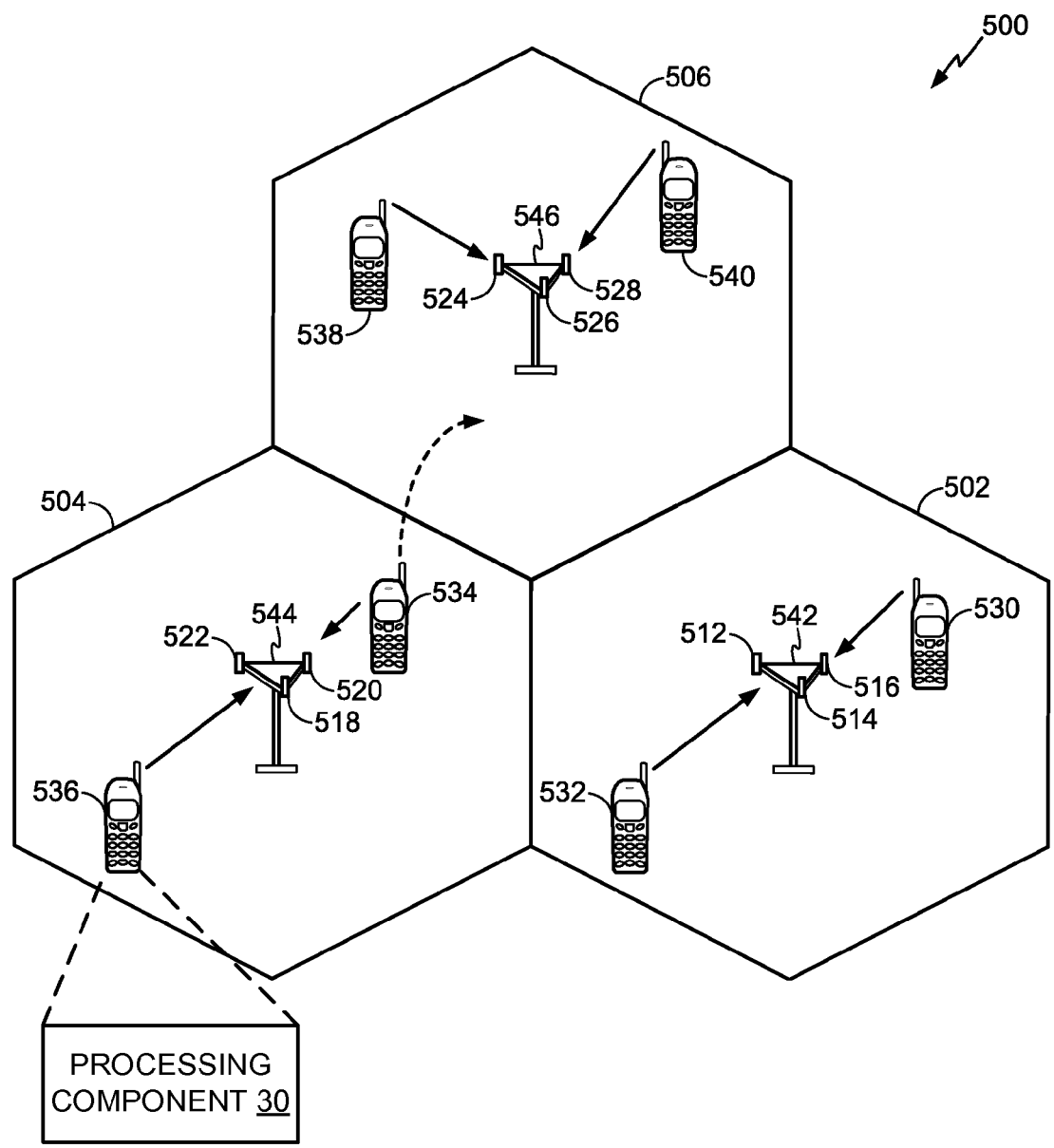
FIG. 7 is a conceptual diagram illustrating an example of an access network.

Referring to FIG. 7, an access network 500 in a UTRAN architecture includes one or more UEs, such as UE 536 that may be the same as or similar to UE 11 (FIG. 1), where each UE may include processing component 30 operable to enable the UE to operate in Dual Carrier mode for extended periods of time during wireless communication, as described herein. Although described with respect to a UTRAN network, UE 536 executing processing component 30 as described herein may operate in any type of communication network using any type of communication protocol or standard that may employ event-triggered reporting for a UE internal measurement similar to the Event 6D triggered event, as described above. The multiple access wireless communication system includes multiple cellular regions (cells), including cells 502, 504, and 506, each of which may include one or more sectors. The multiple sectors can be formed by groups of antennas with each antenna responsible for communication with UEs in a portion of the cell. For example, in cell 502, antenna groups 512, 514, and 516 may each correspond to a different sector. In cell 504, antenna groups 518, 520, and 522 each correspond to a different sector. In cell 506, antenna groups 524, 526, and 528 each correspond to a different sector. The cells 502, 504 and 506 may include several wireless communication devices, e.g., User Equipment or UEs, which may be in communication with one or more sectors of each cell 502, 504 or 506. For example, UEs 530 and 532 may be in communication with Node B 542, UEs 534 and 536 may be in communication with Node B 544, and UEs 538 and 540 can be in communication with Node B 546. Here, each Node B 542, 544, 546 is configured to provide an access point to a core network 404 (see FIG. 6) for all the UEs 530, 532, 534, 536, 538, 540 in the respective cells 502, 504, and 506.

As the UE 534 moves from the illustrated location in cell 504 into cell 506, a serving cell change (SCC) or handover may occur in which communication with the UE 534 transitions from the cell 504, which may be referred to as the source cell, to cell 506, which may be referred to as the target cell. Management of the handover procedure may take place at the UE 534, at the Node Bs corresponding to the respective cells, at a radio network controller 406 (see FIG. 6), or at another suitable node in the wireless network. For example, during a call with the source cell 504, or at any other time, the UE 534 may monitor various parameters of the source cell 504 as well as various parameters of neighboring cells such as cells 506 and 502. Further, depending on the quality of these parameters, the UE 534 may maintain communication with one or more of the neighboring cells. During this time, the UE 534 may maintain an Active Set, that is, a list of cells that the UE 534 is simultaneously connected to (i.e., the UTRA cells that are currently assigning a downlink dedicated physical channel DPCH or fractional downlink dedicated physical channel F-DPCH to the UE 534 may constitute the Active Set).

The modulation and multiple access scheme employed by the access network 500 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system, and the use of processing component 30 described herein may be implemented in any such standards that may employ event-triggered reporting for a UE internal measurement similar to the Event 6D triggered event, as described above.

The radio protocol architecture may take on various forms depending on the particular application. An example for an HSPA system will now be presented with reference to FIG. 8, although it should be understood that the aspects described herein may not be limited to use with an HSPA system.

Figure 8:
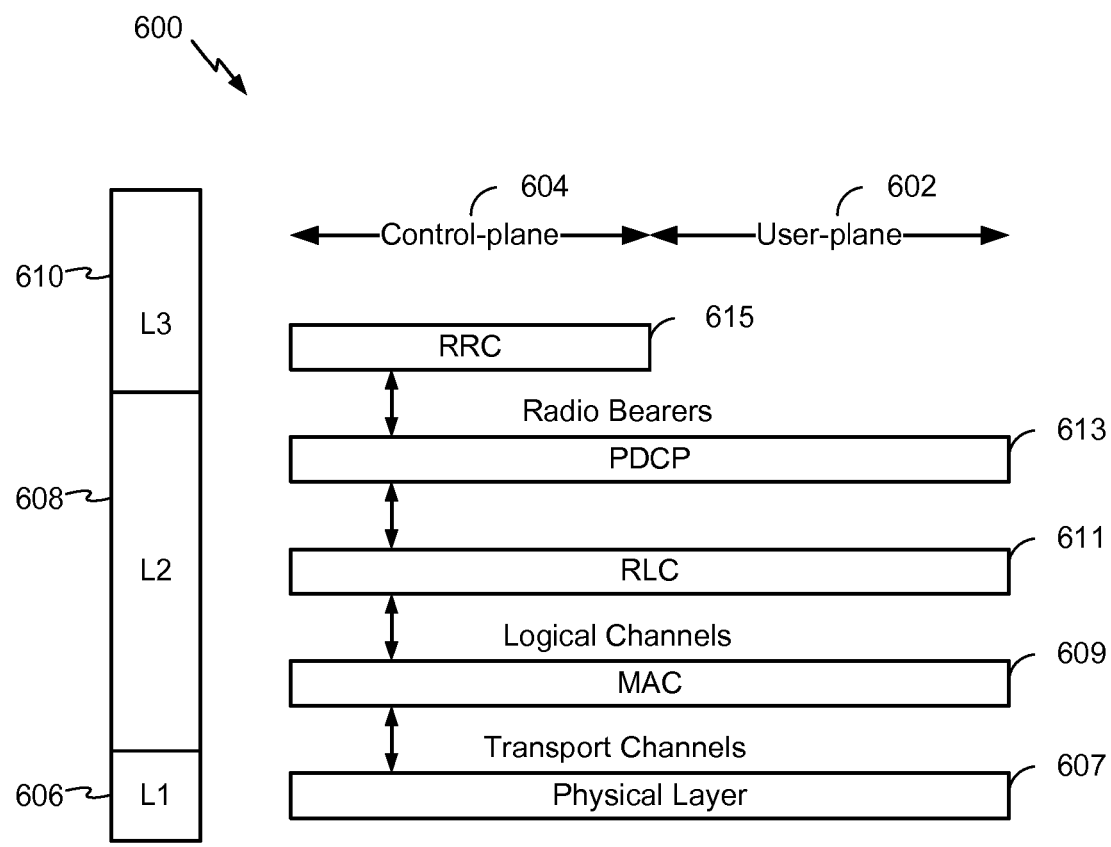
FIG. 8 is a conceptual diagram illustrating an example of a radio protocol architecture for the user and control plane.

Referring to FIG. 8, an example radio protocol architecture 600 relates to the user plane 602 and the control plane 604 of a user equipment (UE) or node B/base station. For example, architecture 600 may be included in a UE such as UE 11 (FIG. 1) configured to execute processing component 30 and enable UE 11 (FIG. 1), to operate in Dual Carrier mode for extended periods of time during wireless communication. The radio protocol architecture 600 for the UE and node B is shown with three layers: Layer 1 606, Layer 2 608, and Layer 3 610. Layer 1 606 is the lowest lower and implements various physical layer signal processing functions. As such, Layer 1 606 includes the physical layer 607. Layer 2 (L2 layer) 608 is above the physical layer 607 and is responsible for the link between the UE and node B over the physical layer 607. Layer 3 (L3 layer) 610 includes a radio resource control (RRC) sublayer 615. The RRC sublayer 615 handles the control plane signaling of Layer 3 between the UE and the UTRAN.

In the user plane, the L2 layer 608 includes a media access control (MAC) sublayer 609, a radio link control (RLC) sublayer 611, and a packet data convergence protocol (PDCP) 613 sublayer, which are terminated at the node B on the network side. Although not shown, the UE may have several upper layers above the L2 layer 608 including a network layer (e.g., IP layer) that is terminated at a PDN gateway on the network side, and an application layer that is terminated at the other end of the connection (e.g., far end UE, server, etc.).

The PDCP sublayer 613 provides multiplexing between different radio bearers and logical channels. The PDCP sublayer 613 also provides header compression for upper layer data packets to reduce radio transmission overhead, security by ciphering the data packets, and handover support for UEs between node Bs. The RLC sublayer 611 provides segmentation and reassembly of upper layer data packets, retransmission of lost data packets, and reordering of data packets to compensate for out-of-order reception due to hybrid automatic repeat request (HARQ). The MAC sublayer 609 provides multiplexing between logical and transport channels. The MAC sublayer 609 is also responsible for allocating the various radio resources (e.g., resource blocks) in one cell among the UEs. The MAC sublayer 609 is also responsible for HARQ operations.

Figure 9:
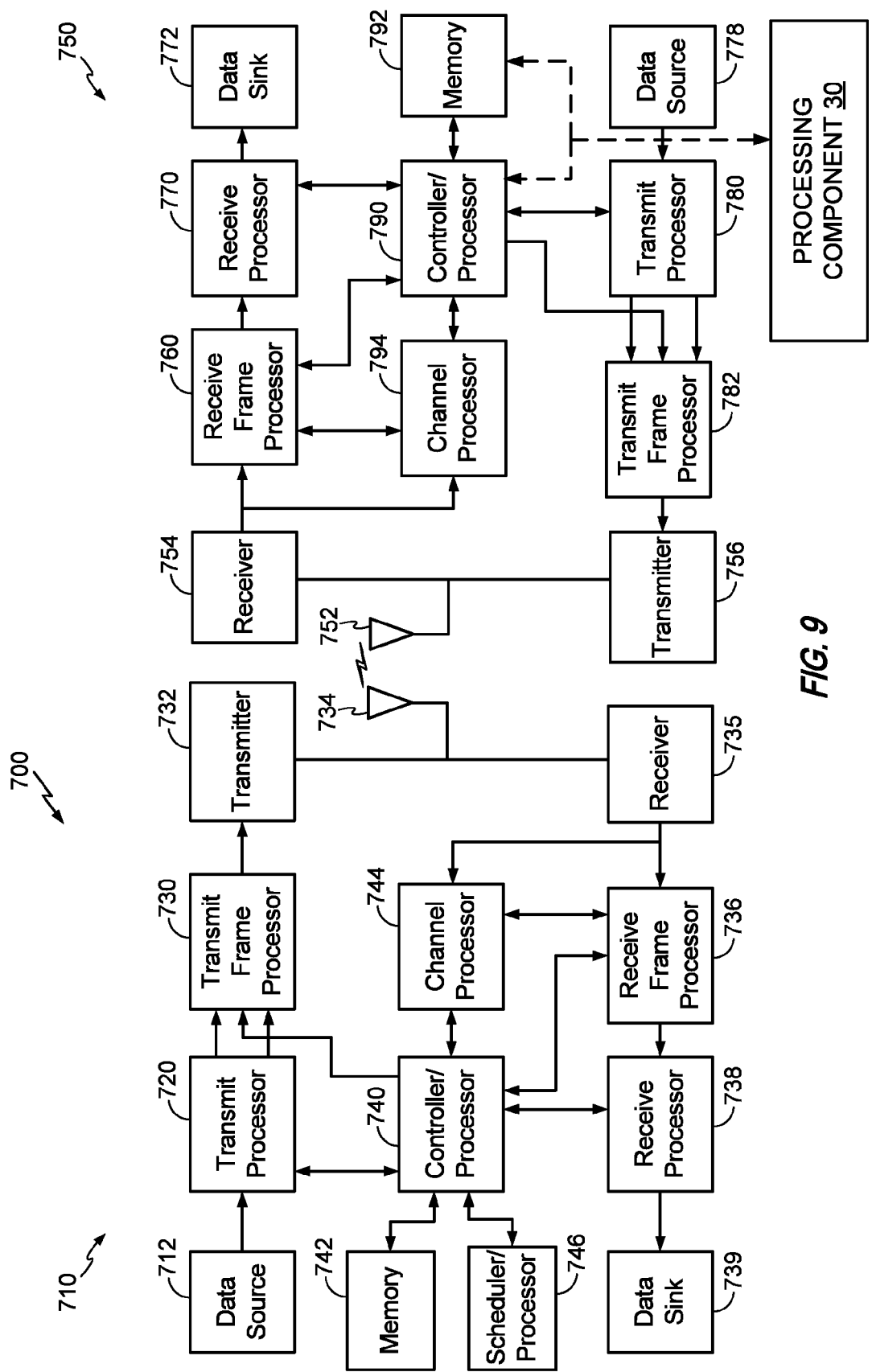
FIG. 9 is a block diagram conceptually illustrating an example of a Node B in communication with a UE in a telecommunications system.

FIG. 9 is a block diagram of an aspect of example architectural components of Node B 710 in communication with a UE 750, where the Node B 710 may be an aspect of the network entity 12 in FIG. 1 or Node B 208 in FIG. 2, and the UE 750 may be an aspect of UE 11 in FIG. 1 or UE 410 in FIG. 6 or one of the UEs in FIG. 7, where UE 750 may include processing component 30 described herein that is operable to enable UE 750 to operate in Dual Carrier mode for extended periods of time during wireless communication. As illustrated by dashed lines, processing component 30 may be implemented in controller/processor 790 and/or memory 792 of UE 750. In the downlink communication, a transmit processor 720 may receive data from a data source 712 and control signals from a controller/processor 740. The transmit processor 720 provides various signal processing functions for the data and control signals, as well as reference signals (e.g., pilot signals). For example, the transmit processor 720 may provide cyclic redundancy check (CRC)

codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 744 may be used by a controller/processor 740 to determine the coding, modulation, spreading, and/or scrambling schemes for the transmit processor 720. These channel estimates may be derived from a reference signal transmitted by the UE 750 or from feedback from the UE 750. The symbols generated by the transmit processor 720 are provided to a transmit frame processor 730 to create a frame structure. The transmit frame processor 730 creates this frame structure by multiplexing the symbols with information from the controller/processor 740, resulting in a series of frames. The frames are then provided to a transmitter 732, which provides various signal conditioning functions including amplifying, filtering, and modulating the frames onto a carrier for downlink transmission over the wireless medium through antenna 734. The antenna 734 may include one or more antennas, for example, including beam steering bidirectional adaptive antenna arrays or other similar beam technologies.

At the UE 750, a receiver 754 receives the downlink transmission through an antenna 752 and processes the transmission to recover the information modulated onto the carrier. The information recovered by the receiver 754 is provided to a receive frame processor 760, which parses each frame, and provides information from the frames to a channel processor 794 and the data, control, and reference signals to a receive processor 770. The receive processor 770 then performs the inverse of the processing performed by the transmit processor 720 in the Node B 710. More specifically, the receive processor 770 descrambles and despreads the symbols, and then determines the most likely signal constellation points transmitted by the Node B 710 based on the modulation scheme. These soft decisions may be based on channel estimates computed by the channel processor 794. The soft decisions are then decoded and deinterleaved to recover the data, control, and reference signals. The CRC codes are then checked to determine whether the frames were successfully decoded. The data carried by the successfully decoded frames will then be provided to a data sink 772, which represents applications running in the UE 750 and/or various user interfaces (e.g., display). Control signals carried by successfully decoded frames will be provided to a controller/processor 790. When frames are unsuccessfully decoded by the receiver processor 770, the controller/processor 790 may also use an acknowledgement (ACK) and/or negative acknowledgement (NACK) protocol to support retransmission requests for those frames.

In the uplink, data from a data source 778 and control signals from the controller/processor 790 are provided to a transmit processor 780. The data source 778 may represent applications running in the UE 750 and various user interfaces (e.g., keyboard). Similar to the functionality described in connection with the downlink transmission by the Node B 710, the transmit processor 780 provides various signal processing functions including CRC codes, coding and interleaving to facilitate FEC, mapping to signal constellations, spreading with OVSFs, and scrambling to produce a series of symbols. Channel estimates, derived by the channel processor 794 from a reference signal transmitted by the Node B 710 or from feedback contained in the midamble transmitted by the Node B 710, may be used to select the appropriate coding, modulation, spreading, and/or scrambling schemes. The symbols produced by the transmit processor 780 will be provided to a transmit frame processor 782 to create a frame structure. The transmit frame processor 782 creates this frame structure by multiplexing the symbols with information from the controller/processor 790, resulting in a series of frames. The frames are then provided to a transmitter 756, which provides various signal conditioning functions including amplification, filtering, and modulating the frames onto a carrier for uplink transmission over the wireless medium through the antenna 752.

The uplink transmission is processed at the Node B 710 in a manner similar to that described in connection with the receiver function at the UE 750. A receiver 735 receives the uplink transmission through the antenna 734 and processes the transmission to recover the information modulated onto the carrier. The information recovered by the receiver 735 is provided to a receive frame processor 736, which parses each frame, and provides information from the frames to the channel processor 744 and the data, control, and reference signals to a receive processor 738. The receive processor 738 performs the inverse of the processing performed by the transmit processor 780 in the UE 750. The data and control signals carried by the successfully decoded frames may then be provided to a data sink 739 and the controller/processor, respectively. If some of the frames were unsuccessfully decoded by the receive processor, the controller/processor 740 may also use an acknowledgement (ACK) and/or negative acknowledgement (NACK) protocol to support retransmission requests for those frames.

The controller/processors 740 and 790 may be used to direct the operation at the Node B 710 and the UE 750, respectively. For example, the controller/processors 740 and 790 may provide various functions including timing, peripheral interfaces, voltage regulation, power management, and other control functions. The computer readable media of memories 742 and 792 may store data and software for the Node B 710 and the UE 750, respectively. A scheduler/processor 746 at the Node B 710 may be used to allocate resources to the UEs and schedule downlink and/or uplink transmissions for the UEs.

Several aspects of a telecommunications system have been presented with reference to an HSPA system. As those skilled in the art will readily appreciate, various aspects described throughout this disclosure, e.g., the operation of processing component 30, may be extended to other telecommunication systems, network architectures and communication standards that may employ event-triggered reporting for a UE internal measurement similar to the Event 6D triggered event, as described above.

By way of example, various aspects may be extended to other UMTS systems that may employ event-triggered reporting for a UE internal measurement similar to the Event 6D triggered event, where such other systems may include W-CDMA, TD-SCDMA, High Speed Downlink Packet Access (HSDPA), High Speed Uplink Packet Access (HSUPA), High Speed Packet Access Plus (HSPA+) and TD-CDMA. Various aspects may also be extended to other systems that may employ event-triggered reporting for a UE internal measurement similar to the Event 6D triggered event, where such other systems may include Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system and whether the system employs event-triggered reporting for a UE internal measurement similar to the Event 6D triggered event, as described herein.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or stored instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. Also, a phrase referring to "at least one of" a list of items refers to any combination of those items, including single members. As an example, "at least one of: a, b, or c" or "at least one of: a, b, and c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of enabling a user equipment (UE) to operate in Dual Carrier mode during wireless communication, comprising:
    generating, at the UE, an event trigger to be transmitted to a network entity from the UE in response to the UE satisfying a maximum transmit power threshold value, wherein generating the event trigger initiates a trigger timer that controls when to transmit the event trigger to the network;
    determining, at the UE, whether a plurality of optimization conditions are met, wherein determining whether the plurality of optimization conditions are met further comprises:
        determining whether the UE satisfies the event trigger for a transport format indicator on both carriers in the Dual Carrier mode, wherein the transport format indicator is used in the Dual Carrier mode;
        determining whether the UE does not satisfy the event trigger for the transport format indicator on one carrier in a Single Carrier mode; and
        determining whether a UE control power requirement satisfies a power ratio threshold; and
    modifying, at the UE, a transmission scheme based on the determination that the plurality of optimization conditions are met, wherein modifying the transmission scheme prevents the transmission of the event trigger to the network entity from the UE.

2. The method of claim 1, wherein modifying the transmission scheme occurs based on the determinations that the UE satisfies the event trigger for the transport format indicator on both carriers in the Dual Carrier mode, that the UE does not satisfy the event trigger for the transport format indicator on one carrier in the Single Carrier mode, and that the UE control power requirement satisfies the power ratio threshold.

3. The method of claim 1, wherein the transport format indicator comprises an Enhanced Dedicated Channel (E-DCH) Transport Format Combination Indication.

4. The method of claim 1, wherein the UE control power requirement comprises a traffic to pilot (T2P) ratio.

5. The method of claim 1, wherein modifying the transmission scheme further comprises lowering the transport format indicator on at least one or both carriers in the Dual Carrier mode.

6. The method of claim 1, wherein modifying the transmission scheme further comprises switching to Discontinuous Transmission (DTX) on at least one or both carriers in the Dual Carrier mode.

7. The method of claim 1, wherein modifying the transmission scheme further comprises transmitting a buffer indicator to the network entity, wherein the buffer indicator indicates a lower-than-actual amount of data packets in a transmit buffer of the UE.

8. The method of claim 1, further comprising:
determining that the plurality of optimization conditions are not met;
transmitting the event trigger to the network entity based at least in part on the determination that the plurality of optimization conditions are not met; and
receiving a reconfiguration message from the network entity to switch the UE from Dual Carrier mode to Single Carrier mode, wherein the UE transmits on a single uplink carrier during Single Carrier mode.

9. The method of claim 1, wherein the event trigger comprises an Event 6D trigger.

10. A non-transitory computer-readable medium storing computer executable code for enabling a user equipment (UE) to operate in Dual Carrier mode for extended periods of time during wireless communication, comprising:
code for generating, at the UE, an event trigger to be transmitted to a network entity from the UE in response to the UE satisfying a maximum transmit power threshold value, wherein generating the event trigger initiates a trigger timer that controls when to transmit the event trigger to the network;
code for determining, at the UE, whether a plurality of optimization conditions are met, wherein the code for determining whether the plurality of optimization conditions are met further comprises:
code for determining whether the UE satisfies the event trigger for a transport format indicator on both carriers in the Dual Carrier mode, wherein the transport format indicator is used in the Dual Carrier mode;
code for determining whether the UE does not satisfy the event trigger for the transport format indicator on one carrier in a Single Carrier mode; and
code for determining whether a UE control power requirement satisfies a power ratio threshold; and
code for modifying, at the UE, a transmission scheme based on the determination that the plurality of optimization conditions are met, wherein modifying the transmission scheme prevents the transmission of the event trigger to the network entity from the UE.

11. An apparatus for enabling a user equipment (UE) to operate in Dual Carrier mode for extended periods of time during wireless communication, comprising:
an event component configured to generate, at the UE, an event trigger to be transmitted to a network entity from the UE in response to the UE satisfying a maximum transmit power threshold value, wherein generating the event trigger initiates a trigger timer that controls when to transmit the event trigger to the network;
a determining component configured to determine, at the UE, whether a plurality of optimization conditions are met, wherein the determining component configured to determine whether the plurality of optimization conditions are met is further configured to:
determine whether the UE satisfies the event trigger for a transport format indicator on both carriers in the Dual Carrier mode, wherein the transport format indicator is used in the Dual Carrier mode;
determine whether the UE does not satisfy the event trigger for the transport format indicator on one carrier in a Single Carrier mode; and
determine whether a UE control power requirement satisfies a power ratio threshold; and
a modifying component configured to modify, at the UE, a transmission scheme based on the determination that the plurality of optimization conditions are met, wherein modifying the transmission scheme prevents the transmission of the event trigger to the network entity from the UE.

12. The apparatus of claim 11, wherein the modifying component is configured to modify the transmission scheme occurs based on the determinations that the UE satisfies the event trigger for the transport format indicator on both carriers in the Dual Carrier mode, that the UE does not satisfy the event trigger for the transport format indicator on one carrier in the Single Carrier mode, and that the UE control power requirement satisfies the power ratio threshold.

13. The apparatus of claim 11, wherein the transport format indicator comprises an Enhanced Dedicated Channel (E-DCH) Transport Format Combination Indication.

14. The apparatus of claim 11, wherein the UE control power requirement comprises a traffic to pilot (T2P) ratio.

15. The apparatus of claim 11, wherein the modifying component is configured to lower the transport format indicator on at least one or both carriers in the Dual Carrier mode.

16. The apparatus of claim 11, wherein the modifying component is configured to switch to Discontinuous Transmission (DTX) on at least one or both carriers in the Dual Carrier mode.

17. The apparatus of claim 11, wherein the modifying component is configured to transmit a buffer indicator to the network entity, wherein the buffer indicator indicates a lower-than-actual level of data packets in a transmit buffer of the UE.

18. The apparatus of claim 11, wherein the determining component is further configured to determine that the plurality of optimization conditions are not met; and
wherein the modifying component is further configured to:
transmit the event trigger to the network entity based on the determination that the plurality of optimization conditions are not met; and
receive a reconfiguration message from the network entity to switch the UE from Dual Carrier mode to Single Carrier mode, wherein the UE transmits on a single uplink carrier during Single Carrier mode.

* * * * *